Patented Feb. 25, 1936

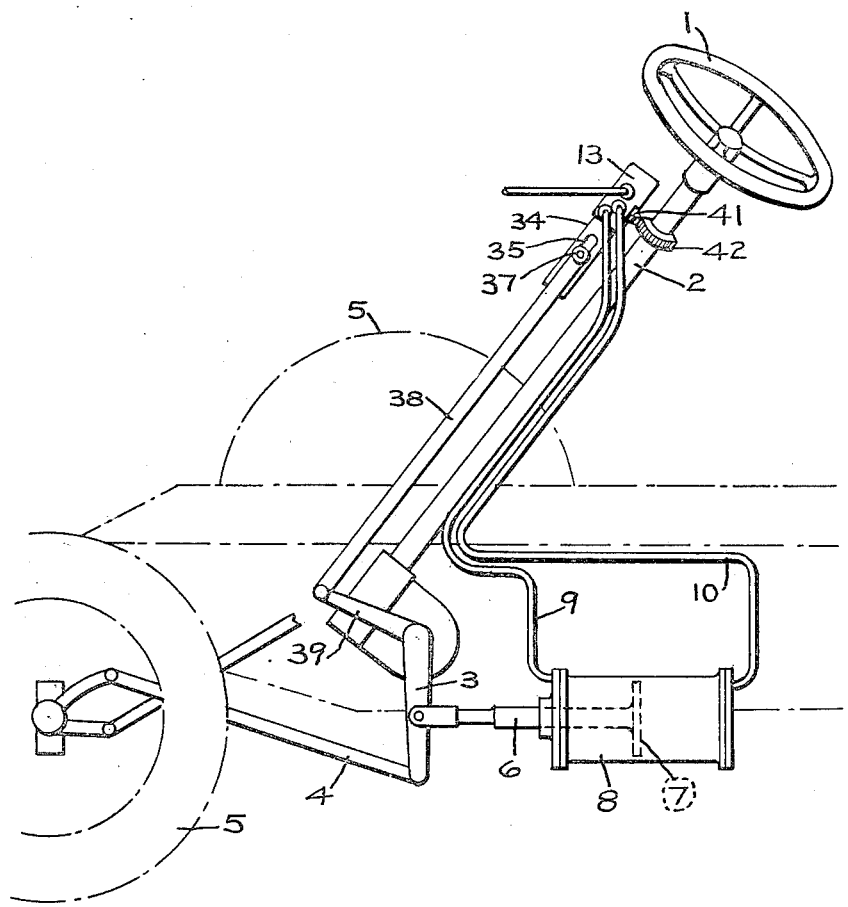

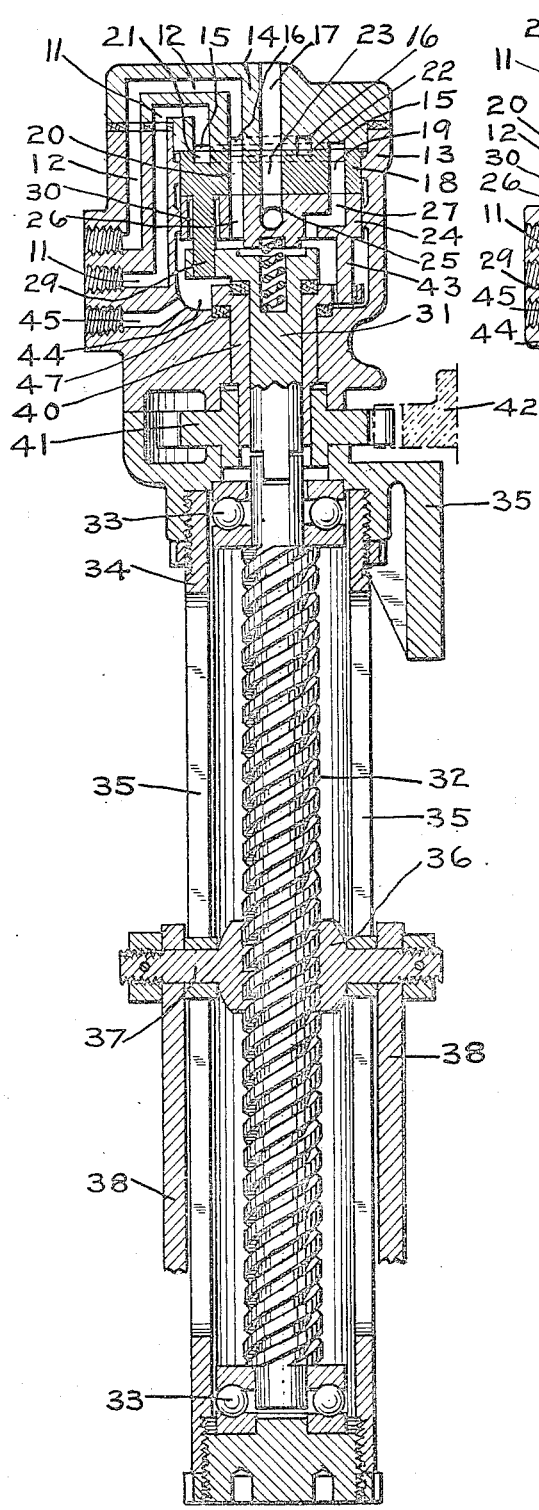
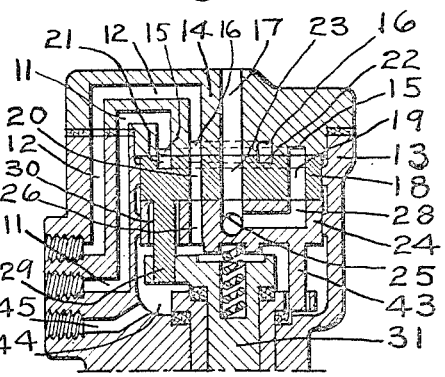

2,032,146

UNITED STATES PATENT OFFICE 2,032,146

STEERING MECHANISM

Anselme Neveu, Livry-Gargan, France, assignor to The Westinghouse Air Brake Company, Wilmerding, Pa., a corporation of Pennsylvania Application September 26, 1933, Serial No. 691,014
In France May 12, 1933

1 Claim. (Cl. 180—79.2)

This invention relates to steering mechanism for automobile or like vehicles of the kind in which the movement of the steering gear connected to the wheels of the vehicle is arranged to be effected by a servo device operated by fluid under pressure under the control of the steering wheel, and has for its object to provide an improved construction of steering mechanism of this character.

The invention utilizes the lost motion between the steering wheel or steering column and the steering gear to effect the adjustment of valve mechanism controlling communication between the servo device and a source of fluid under pressure or vacuum, and according to the principal feature of the invention this valve mechanism comprises two relatively movable and cooperating valve members, one of which is operated by the steering wheel or steering column and the other being operated by the steering gear preferably through a nut and screw transmission.

The invention is illustrated by way of example in the accompanying drawings of which Figure 1 is a view showing the general arrangement of a form of steering mechanism embodying the invention, Figure 2 being a sectional view on an enlarged scale of the valve mechanism and its associated elements. Figure 3 is a view of a portion of the valve mechanism of Figure 2 showing the relative position of the parts during the steering operation.

Referring now to the drawings, it will be seen that the front portion of an automobile vehicle is illustrated in Figure 1 as provided with the usual steering wheel 1 mounted upon the upper end of a steering column 2, the lower end of which is connected through the usual gearing to a lever 3 which in turn is pivotally connected through a rod 4 to the axle mounting of the front wheels 5 of the vehicle.

An intermediate point in the lever 3 is pivotally connected to the piston rod 6 of the servo device which comprises a piston 7 adapted to reciprocate in a cylinder 8. The opposite ends of the cylinder 8 are connected by means of pipes 9, 10 respectively to the passages 11, 12 in the control valve device 13. The valve device 13 comprises a stationary valve seat member 14 provided with an annular cavity 15 in open communication with the passage 11 and an annular cavity 16 in open communication with the passage 12, together with a central port 17 open to the atmosphere. An upper valve member 18 cooperates with the valve seat of the member 14 and is provided with ports 19, 20 adapted to register with the cavities 15 and 16, respectively, the ports 19, 20 opening into annular cavities 21, 22, respectively, formed in the upper face of the valve member 18. A central port 23 in the valve member 18 is in permanent communication with the central port 17 in the valve seat 14.

Cooperating with the lower face of the valve member 18 is a lower valve member 24 provided with central cavity 25 in open communication with the port 23, ports 26 and 27 adapted to register with the ports 20, 19, respectively, in the upper valve member 18 and two ports, one of which is indicated at 28 in Figure 3 communicating with the cavity 25 and adapted to register respectively with the ports 19, 20 in the valve member 18.

The valve member 18 is arranged to be operated by means of one or more studs or pins 29 secured to or formed integral with the valve member 18 and passing freely through suitable openings 30 in the lower valve member 24, the lower end of the studs 29 being secured to a rotatable spindle 31 which is operatively connected to a spindle 32 having a screw thread of relatively steep pitch formed thereon. The spindle 32 is mounted in suitable ball bearings 33 in a frame 34 provided with longitudinal slots 35, the upper end of the frame 34 being secured to the body of the valve device 13 which is mounted upon the frame of the vehicle by means of a suitable bracket 35.

An internally screw-threaded nut member 36 cooperates with the spindle 32 and is provided with trunnions or pivot pins 37 adapted to slide in the slots 35, the trunnions 37 being operatively connected by means of links 38 to a lever 39 which is mechanically connected to the lever 3.

A short tubular shaft or sleeve 40 is rotatably mounted upon the shaft 31 and is carried in a suitable bearing in the body of the valve device 13, the lower end of the shaft 40 carrying rigidly secured thereto a gear wheel 41 adapted to intermesh with a gear wheel 42 mounted on the steering column 2. The shaft 40 is arranged to operate the lower valve member 24 by means of one or more studs 43 secured to or formed integral with this valve member.

The upper ends of the shafts 31 and 40 are located in a chamber 44 formed in the body of the valve device 13 below the valve member 24, the chamber 44 being supplied with fluid under pressure through passage 45 and pipe 46 leading to a suitable reservoir (not shown). Leakage of fluid from the chamber 44 past the shafts 31 and 40 is prevented by the provision of suitable packings 47.

The operation of the mechanism is as follows:

So long as the driver of the vehicle maintains the steering wheel 1 and steering column 2 stationary in any angular position the parts of the mechanism occupy the position shown in Figure 2 in which fluid under pressure is supplied from the chamber 44 to the left hand end of the cylinder 8 of the servo device by way of port 27 in the lower valve member 24, port 19 in the upper valve member 18, cavities 21 and 15, passage 11 and pipe 9. Fluid under pressure is at the same time supplied to the right hand end of the cylinder 8 by way of port 26 in the lower valve member 24, port 20 in the upper valve member 18, cavities 22 and 16, passage 12 and pipe 10.

Both ends of the cylinder 8 are thus supplied simultaneously with fluid under pressure and the piston 7 is thus held stationary and maintains the wheels 5 of the vehicle in the position to which they have been set by the steering wheel 1.

If now the driver of the vehicle rotates the steering wheel 1 in a counter-clockwise direction in order to turn to the left, the gear wheel 42 will be correspondingly rotated and will cause the gear wheel 41 to rotate in a clockwise direction. The lower valve member 24 will accordingly be rotated to the position shown in Figure 3 in which fluid under pressure from the chamber 44 is still supplied to the right hand end of the cylinder 8 by way of ports 26 and 20 through passage 12 and pipe 10. The left hand end of the cylinder 8 is however put into communication with the atmosphere by way of pipe 9, passage 11, cavities 21 and 15, and ports 19, 28, cavity 25 and ports 23 and 17.

The piston 7 is accordingly moved towards the left by the pressure in the right hand end of the cylinder 8 and the piston rod 6 by means of the lever 3 and rod 4 effects the displacement towards the left of the wheels 5.

The movement of the lever 3 effects a corresponding movement of the lever 39 and an upward movement of the links 38 and of the nut member 36 connected thereto. This movement of the member 36 causes a corresponding rotational movement of the spindle 32 which is transmitted through the shaft 31 to the upper valve member 18. The latter is consequently rotated so as to restore the valve member 18 to its original position relative to the lower valve member 24 shown in Figure 2 in which the left hand end of the cylinder 8 is again supplied with fluid under pressure as above described.

A similar action is evidently effected when the steering wheel 1 is rotated in a clockwise direction to cause the wheels 5 to be displaced towards the right, the movement of the lower valve member 24 relative to the upper valve member 18 causing the right hand end of the cylinder 8 to be vented to the atmosphere, until the original relative position of the valve members 18 and 24 is restored by the actual displacement of the wheels 5.

It will thus be evident that the initial movement of the steering wheel 1 corresponding to the lost motion between the steering column 2 and the levers 3 and 39 is caused to effect a movement of the lower valve member 24 relative to the upper valve member 18 which effects the release of fluid under pressure from one end or the other of the cylinder 8 of the servo device, thereby causing the latter to effect a corresponding movement of the lever 3 and the wheels 5 of the vehicle. This movement transmitted through the lever 39 and spindle 32 rotates the upper valve member 18 to a position in which the relative position of the valve members 18 and 24 is that originally obtaining before the steering wheel 1 was rotated so that fluid is again supplied to both ends of the cylinder 8.

In the event of failure of the source of supply of fluid under pressure or in the event of the servo device or its control valve device 13 becoming inoperative for any reason, it will be understood that the steering wheel 1 will directly operate the steering gear in the usual manner through the steering column 2 and the lever 3.

Furthermore in the event of either end of the cylinder 8 of the servo device being unintentionally vented to the atmosphere as for instance by the breakage of the pipes 9 or 10, the consequent movement of the lever 3 to the small extent permitted by the lost motion will cause the spindle 32 to be correspondingly rotated in a direction to move the upper valve member 18 to a position in which fluid is vented from the opposite end of the cylinder 8. The piston 7 will consequently be balanced and an effective displacement of the wheels 5 will not take place.

In cases in which the servo device is adapted to be operated by vacuum, the valve mechanism above described and illustrated will evidently be modified in such a manner that the chamber 44 is in open communication with the atmosphere while the port 17 communicates with the vacuum reservoir or its equivalent. So long as the steering wheel 1 is not being rotated, therefore, both ends of the cylinder 8 will be maintained at atmospheric pressure, one end or the other being put into communication with the port 17 during the initial movement of the steering wheel 1 in one direction or the other.

The invention is evidently not limited to the particular construction above described and illustrated by way of example which may be modified in various respects without exceeding the scope of the invention.

Having now described my invention, what I claim as new and desire to secure by Letters Patent, is:

In a power steering mechanism, the combination with a steering column, a steering element, and a fluid pressure operated motor for operating said element, of a pair of cooperating rotatable valve elements for controlling the fluid pressure on said motor, one of said valve elements being operatively connected to and rotatable by said steering column, a screw-threaded spindle rotatable to operate the other of said valve elements, a nut member engaging the screw-threads of the spindle, the pitch of the screw-threads on the spindle being such that axial movement of the nut will rotate said spindle, an arm operated by the movement of the steering element, and links operatively connected to said nut to effect an axial movement of the nut.

ANSELME NEVEU.